United States Patent [19]
Chupeau

[11] Patent Number: 5,727,078
[45] Date of Patent: Mar. 10, 1998

[54] PROCESS FOR ESTIMATING DISPARITY BETWEEN THE MONOSCOPIC IMAGES MAKING UP A STERESCOPIC IMAGE

[75] Inventor: Bertrand Chupeau, Rennes, France

[73] Assignee: Thomson-CSF, Paris, France

[21] Appl. No.: 481,394

[22] PCT Filed: Jan. 18, 1994

[86] PCT No.: PCT/FR94/00057

§ 371 Date: Jul. 19, 1995

§ 102(e) Date: Jul. 19, 1995

[87] PCT Pub. No.: WO94/17485

PCT Pub. Date: Aug. 4, 1994

[30] Foreign Application Priority Data

Jan. 19, 1993 [FR] France ...................... 93 00477

[51] Int. Cl.⁶ ...................................... G06K 9/00
[52] U.S. Cl. ................. 382/154; 392/254; 392/299; 348/42; 348/43; 348/44
[58] Field of Search ...................... 382/154, 254, 382/299; 348/42, 43, 44

[56] References Cited

PUBLICATIONS

Glazer, Frank–"Scene Matcing by Hiearchical Correlation", Jan. 1983. pp. 432–441.
Chang et al.–"Multiresolution Stereo by Simulated Annealing" Jun. 1990–pp. 885–890.

*Primary Examiner*—Jose L. Couso
*Assistant Examiner*—Anh Hong Do
*Attorney, Agent, or Firm*—Oblon, Spivak, McClelland, Maier & Neustadt, P.C.

[57] ABSTRACT

A process for estimating disparity between images of a stereoscopic image by carrying out a hierarchical decomposition of each monoscopic image (Ir(t), Il(t)), by levels of resolution in order to build at least three pyramids of images of increasing resolution including one low-frequency image pyramid and two high-frequency image pyramids in the horizontal and vertical directions of the images. Subsequently a disparity D is estimated at the coarsest level of resolution and the estimate is refined in each level as the resolution increases.

6 Claims, 4 Drawing Sheets

PROCESS FOR ESTIMATING DISPARITY BETWEEN THE MONOSCOPIC IMAGES MAKING UP A STERESCOPIC IMAGE

BACKGROUND OF THE INVENTION

Field of the Invention

The present invention relates to a process for estimating disparity between the monoscopic images making up a stereoscopic image. It applies in particular to the processing of moving stereoscopic images digitized in sequences, this processing making it possible to obtain a description of the relief through measurements of the distances from the movie cameras. It applies for example to the processing of the signal from stereoscopic televisions or to the special effects processing of a stereoscopic image.

DISCUSSION OF BACKGROUND

Stereoscopic image processing, for example making an object stand out from any type of background, other than blue ones in particular, requires a knowledge of the relief of this object.

A stereoscopic image results from the combining of two monoscopic views captured by two cameras placed at different spots, the distance between the cameras being for example equal to the distance between two eyes and their direction simulating the human gaze for example. Each stereoscopic image therefore consists of a pair of monoscopic images. It is known that a knowledge of the point-to-point disparity between the images of one and the same pair makes it possible to deduce the distance of the filmed objects from the cameras and thus to deduce therefrom a relief datum for these objects.

A physical description of the differences between the two images of a stereoscopic pair is obtained through point-to-point matching providing vector data. The disparity field consists of these vector data which are in fact related to the change of perspective between the two images and to the distance from the cameras to the objects of the scene to be filmed.

A method of point-to-point matching of two images, a left image and a right image, making up a stereoscopic image is described in an article: PROCEEDINGS OF THE CONFERENCE ON COMPUTER VISION AND PATTERN RECOGNITION, Miami Beach, 22–26 June 1986, pages 219–226, IEEE, Silver Spring, US; L. R. WILLIAMS et al.: "A coarse-to-fine control strategy for stereo and motion on a mesh-connected commuter".

A hierarchical decomposition of the images is carried out there by levels of resolution, and then an estimate of the disparities between these images is made, starting from the coarsest level of resolution and going towards finer and finer resolutions. This method, using a single pyramid of images of increasing resolutions, does not always afford a sufficiently accurate estimate, especially for slender objects or for outlines, or again when the regions of disparities are substantially uniform.

The point-to-point disparities between the two images of one and the same pair can be described by vectors, called disparity vectors, the purpose of the invention is to obtain a sequence of fields of disparity vectors corresponding to a sequence of stereoscopic images satisfactorily estimating the differences between the two views of a stereoscopic image, especially with a high accuracy.

SUMMARY OF THE INVENTION

To this end, the subject of the invention is a process for estimating disparity between the monoscopic images making up a stereoscopic image, characterized in that it consists:

- in a first step, in carrying out one and the same hierarchical decomposition of each monoscopic image, by levels of resolution, thereby building at least three pyramids of images of increasing resolutions, one low-frequency image pyramid and two high-frequency image pyramids in the horizontal and vertical directions of the images;

- in a second step, in estimating a disparity at the coarsest level of resolution and in refining the estimate in each level as the resolution increases, the disparity being represented at each point of the image by a vector whose origin is situated at the point of one of the monoscopic images and on the tip at the corresponding point of the other monoscopic image.

The main advantages of the invention are that it improves the accuracy of estimation, especially as regards outlines or slender objects, that it can be used for numerous applications in stereoscopic image processing, and that it makes it possible to associate estimation of motions of objects of a stereoscopic image with the estimation of disparity and that it is simple to implement.

BRIEF DESCRIPTION OF THE DRAWINGS

Other characteristics and advantages of the invention will emerge with the aid of the description which follows, given in connection with the appended drawings which represent.

DETAILED DESCRIPTION OF THE PREFERRED EMBODIMENT

Figure 1:
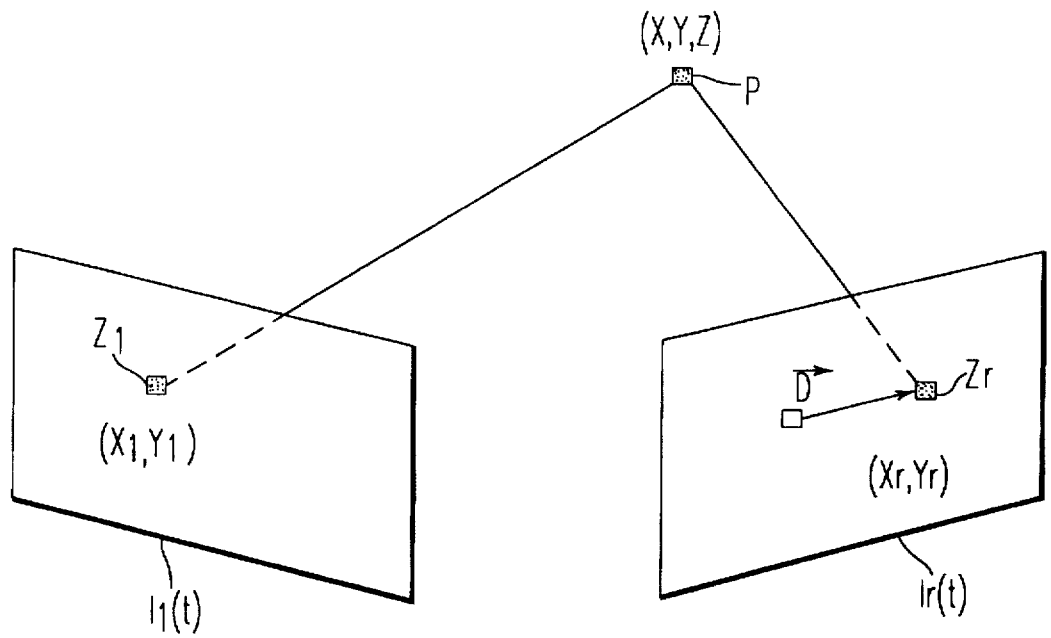
FIG. 1, a pair of images constituting a stereoscopic image, which are obtained with two cameras filming the same scene at two different angles.

A stereoscopic pair of images can be modelled by two perspective projections in different image planes of the same three-dimensional scene. FIG. 1 depicts a pair of natural, monoscopic images $Il(t)$, $Ir(t)$, a left image $Il(t)$ and a right image $Ir(t)$ captured at an instant t, and obtained for example with the aid of two cameras filming the same scene from two different angles.

The problem of estimating disparity consists in the point-to-point matching of the two images or views, right and left. If a point P in space, with spatial coordinates (X, Y, Z) is projected respectively onto the left image $Il(t)$ and onto the right image $Ir(t)$ at a point Zl with coordinates (Xl, Yl) and at a point Zr with coordinates (Xr, Yr), the disparity vector $\vec{D}$ assigned to the point Zr of the right image has components (Xr-Xl, Yr-Yl). It is known that the disparity datum makes it possible to calculate the distance from the points of the filmed scene to the camera, once the optical and geometrical parameters of the acquiring of the images are known. These parameters are, in particular, the focal lengths, the optical centers and the distance between the two cameras.

Figure 2:
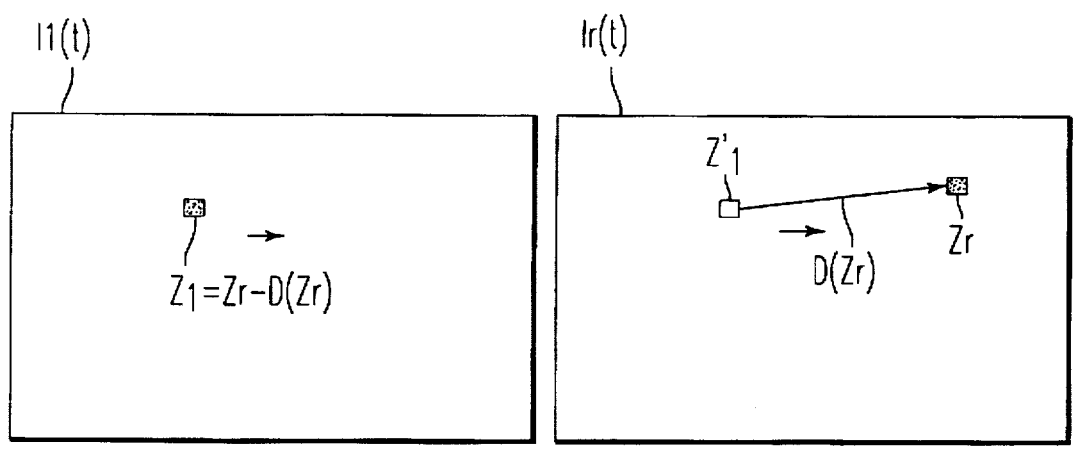
FIG. 2, the preceding images placed side by side.

FIG. 2 depicts, side by side, the two monoscopic images $Il(t)$, $Ir(t)$ of the preceding figure. A disparity vector at an instant t, is defined at each point Zr of the right image $Ir(t)$, the point Zr being labelled by a pair of coordinates (x, y) in this image $Ir(t)$. The disparity vector at this point Zr is for example denoted $\bar{D}$ (Zr). The point of the left image Il(t) corresponding to the point Zr of the right image Ir(t) being denoted Zl, it is connected with the first point Zr through the following relation:

$$Zl = Zr - \bar{D}(zr) \qquad (1)$$

A point Z'l of the right image Ir(t) represents the point Zl of the left image Il(t) in the latter. It is also connected with the point Zr of the right image Ir(t) through relation (1).

According to the invention, the process for estimating stereoscopic disparity between the left image Il(t) and the right image Ir(t) uses a technique for estimating motion between two consecutive images of a monoscopic sequence described in French Patent No. 2,663,178: "Procédé estimation hiéarchique du mouvement dans une séquence d'images", [Process of hierarchical estimation of motion in an image sequence], the right image Ir(t) being akin to an image consecutive to the left image Il(t) and the disparity vector $\bar{D}$ being akin to the motion vector. Thus, in a first step, one and the same hierarchical decomposition of each monoscopic image Ir(t), Il(t) is carried out by levels of resolution. To do this, at least three pyramids of images of increasing resolution are constructed: one low-frequency image pyramid and two high-frequency image pyramids in the horizontal and vertical directions of the images Ir(t), Il(t). In a second step, a disparity is estimated at the coarsest level of resolution, then this estimate is refined in each level of resolution as the resolution increases.

The disparity is analysed with the aid of a hierarchical decomposition of the monoscopic images analysed Ir(t), Il(t) into sub-bands, while preserving at each level of resolution of the decomposition the low-frequency band and the high-frequency bands respectively representing the vertical and horizontal outlines of the image.

Figure 3:
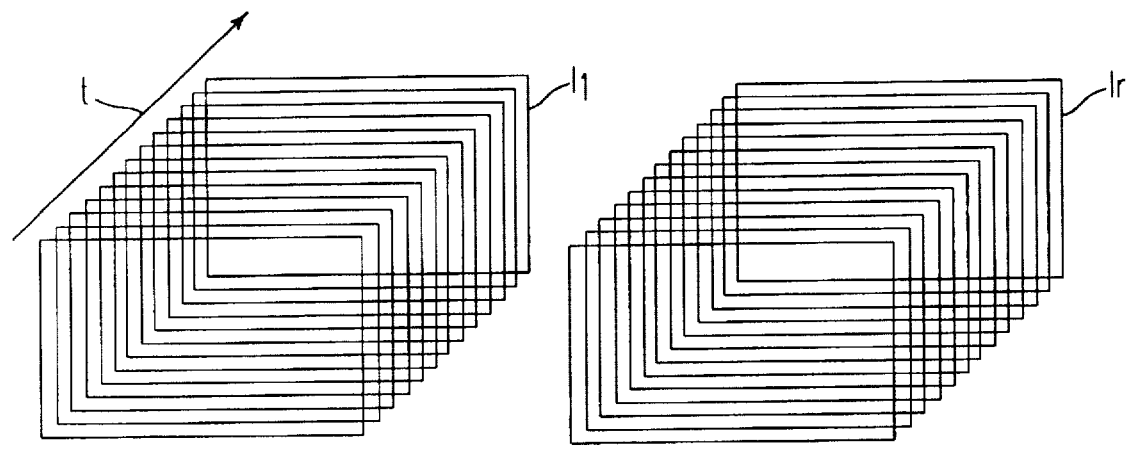
FIG. 3, a sequence of stereoscopic images.

FIG. 3 depicts a sequence of stereoscopic images which is made of left monoscopic images Il and right monoscopic images Ir changing as a function of time t.

With the stereoscopic image changing over time, as FIG. 3 illustrates, it may be necessary to make temporal predictions of the disparities between the left images Il and right images Ir of the stereoscopic image.

Figure 4:
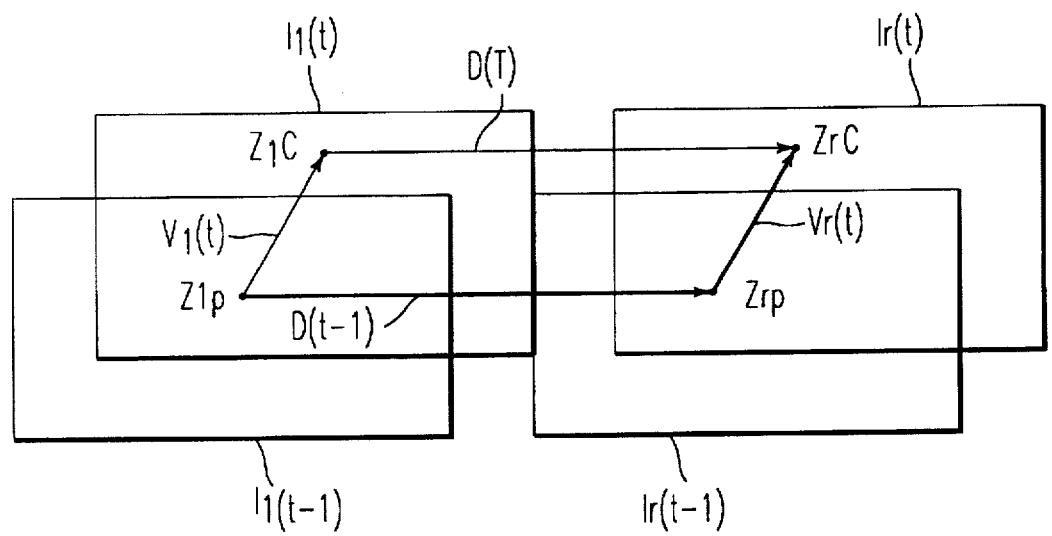
FIG. 4, two series of successive left and right images of a sequence of change of a stereoscopic image.

FIG. 4 depicts two series of successive left and right images of a sequence of change of a stereoscopic image. The left monoscopic image Il(t) captured at an instant t is preceded by a left monoscopic image Il(t−1) captured at an instant t−1. Similarly, the right monoscopic image Ir(t) captured at an instant t is preceded by a right monoscopic image Ir(t−1) captured at an instant t−1.

The temporal prediction of the disparity vector $\bar{D}(t)$ at a point of the right image It(t) is calculated from the disparity vector $\bar{D}(t-1)$ corresponding to this point in the preceding right image Ir(t−1), with the aid of the motion vectors calculated between the instant t and the preceding instant t−1 on the right Ir(t−1), It(t) and left Il(t−1), Il(t) images. These vectors are denoted Vr(t) and Vl(t) respectively, called the right motion vector and left motion vector.

The aforesaid disparity and motion vectors are connected by the following relation:

$$\bar{D}(t) + \bar{V}(t) = \bar{D}(t) + \bar{V}r(t) \qquad (2)$$

In practice, the temporal prediction of the disparity vector $\bar{D}$ (t) at a current point Zrc of the right image Ir(t) at an instant t can for example be obtained as follows: the corresponding point Zrp in the right image Ir(t−1) at the preceding instant t−1 is known through the right motion vector $\bar{V}r(t)$ at the instant t, hence these two points Zrc, Zrp are connected by the following relation:

$$Zrp = Zrc - Vr(t) \qquad (3)$$

The point Zlp of the left image Il(t−1) at the preceding instant t−1 corresponding to the point Zrp of the right image Ir(t−1) captured at the same instant t−1 which corresponds to the current point Zrc of the right image Ir(t) captured at the instant t is known through the disparity vector $\bar{D}(t-1)$ of the preceding instant t−1 in accordance with the following relation:

$$i \; Zlp = Zrp - \bar{D}l(t-1) \qquad (5)$$

The point Zlc corresponding to this point Zlp in the left image Il(t) at the instant t can be obtained with the aid of the left motion vector Vl(t−1), captured at the preceding instant in accordance with the following relation:

$$Zlc = Zlp + \bar{V}l(t-1) \qquad (5)$$

A temporal prediction of the disparity vector $\bar{D}(t)$ at the current point Zrc of the right image Ir(t) at the instant t is given by the vector formed from the pair of points (Zlc, Zrc) where Zlc, corresponding to the current point Zrc of the right image Ir(t) in the left image Il(t) at the same instant t is calculated with the aid of the last three relations (3), (4), (5) established earlier. In this last case, an estimate of motion and of disparity is thus proposed, in which the disparity is predicted temporally by itself, while correcting this prediction by any possible motion of the objects in the stereoscopic scene.

A joint estimate of disparity and of motion can be produced, the motion is estimated for example independently over each of the two right Ir and left Il image sequences. In this case, the motion vector calculated over one sequence, right or left, is predicted temporally only by the motion vectors calculated previously over the same sequence. The motion estimation technique can be that described by French Patent No. 2,663,178. The disparity is, for its part, predicted temporally by the disparity calculated at the preceding instants, compensated by the motions calculated, independently, over the right Ir and left Il images. Relations (3), (4), (5) show that the prediction vector $\bar{D}$ (t) at an instant t requires a knowledge of the prediction vector $\bar{D}(t-1)$ at the preceding instant as well as of the right motion vector Vr(t) at the instant t and of the left motion vector Vl(t−1) at the instant t−1.

Figure 5:
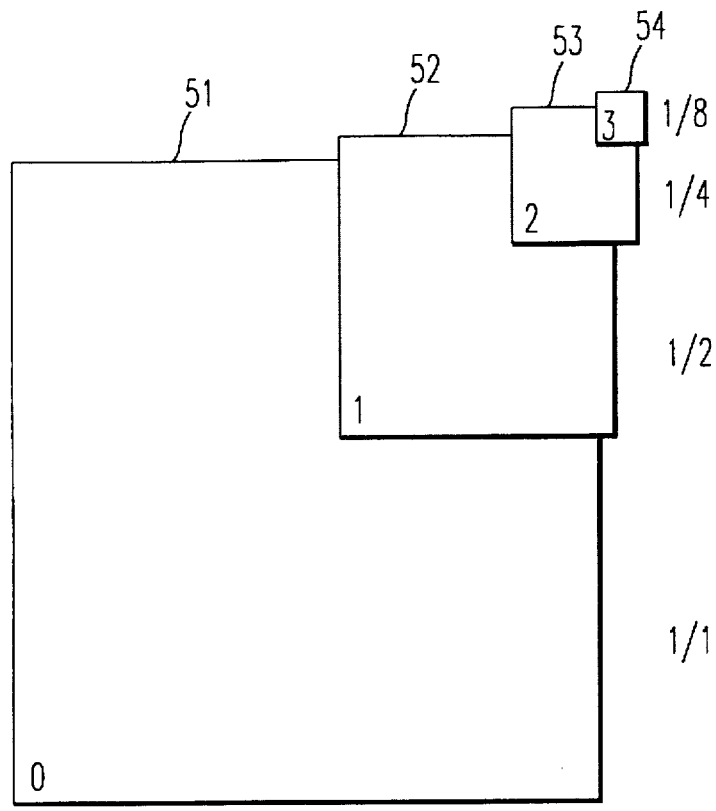
FIG. 5, a pyramidal hierarchical image decomposition.
Figure 6:
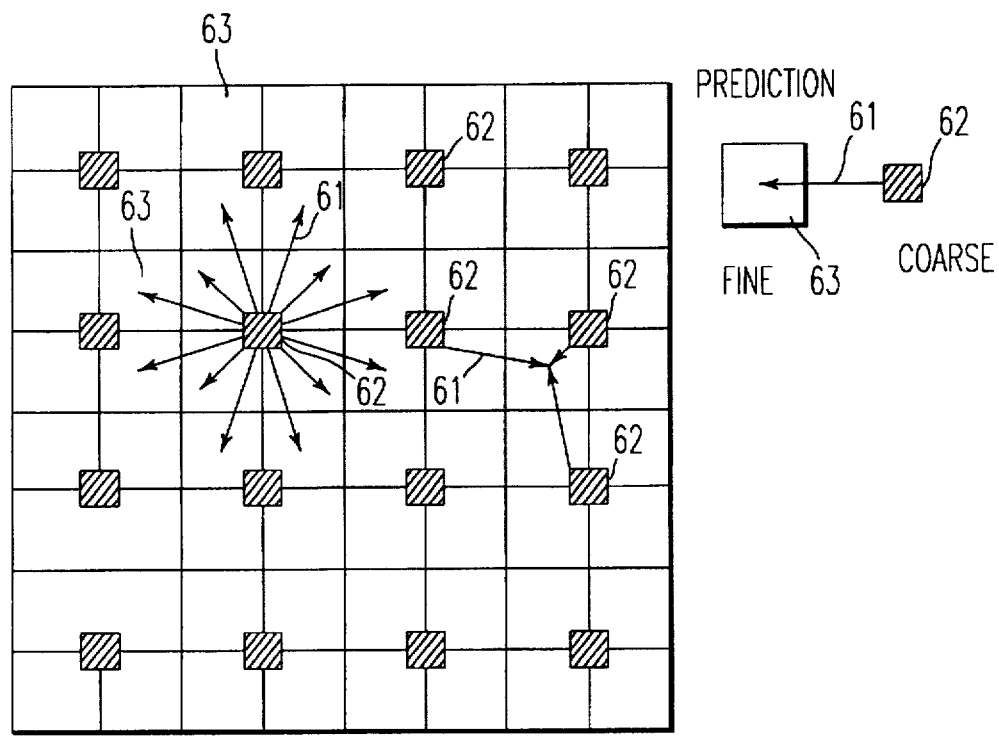
FIG. 6, illustrations of possible predictions.
Figure 7:
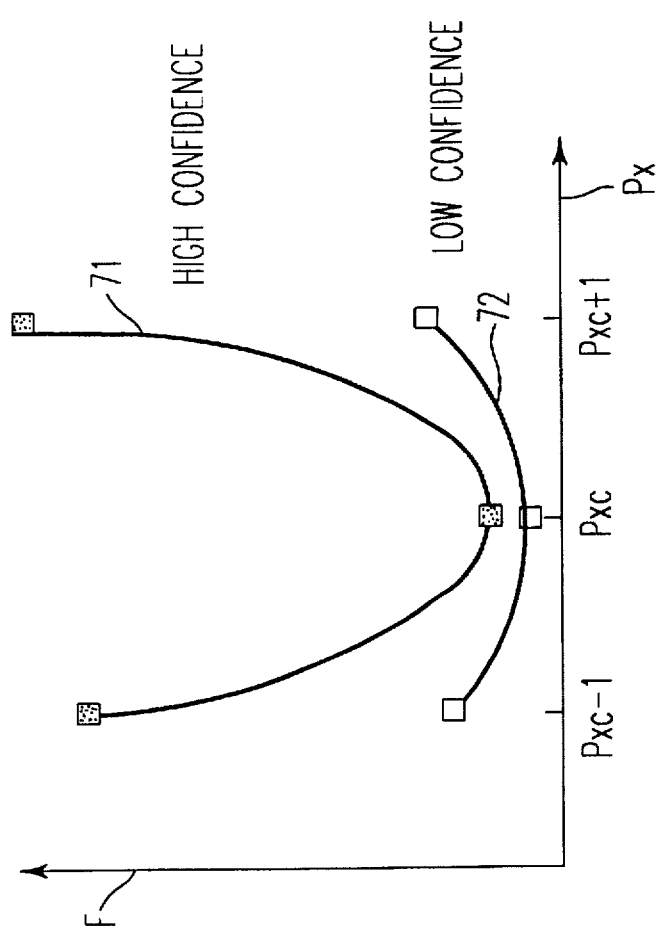
FIG. 7, illustrations of possible cost functions.

FIGS. 5 to 7 accompany the description of improvements to the estimation process described in French Patent No. 2,663,178, which are applicable to the motion estimation or disparity estimation of the present invention. The description of the aforesaid improvements is illustrated by its application to disparity estimation.

As illustrated in FIG. 5, the source images 51, 52, 53, 54 of luminances are decomposed into a multiresolution pyramid. The source image, possessing a number L of lines and a number C of columns, is by definition the image 51 of level 0, with resolution $\frac{1}{2}^0 = \frac{1}{1}$ in such a pyramid. In this pyramid an image of level i, with resolution $\frac{1}{2}^i$, is made up of $L/2^i$ lines and $C/2^i$ columns. It is obtained through i low-pass filterings and i successive linewise and columnwise subsamplings by 2. This low-frequency image pyramid is deduced from a hierarchical decomposition into sub-bands such as described by French Patent No. 2,663,178.

Image analysis takes place hierarchically over the pyramid. It then consists in firstly making a global estimate at a coarse level of resolution of the image, and in then refining this estimate as the resolution of the processed images increases. At each level of resolution $\frac{1}{2}^i$ in the pyramid, the disparity vectors estimated at the immediately coarser level of resolution $\frac{1}{2}^{i+1}$ have their modulus multiplied by two in order to take into account the sub-sampling factor and are used for prediction. The aforesaid patent describes how this prediction can be improved by proposing four predictions, rather than just a single one arising from an immediately preceding coarser level, for the calculation of a disparity vector at the current level. This amounts to including the contribution from a vector of the coarse level for the prediction of four to sixteen points of the following finer level. However, it is possible for example to reduce the number of predictions arising from the coarse level to three for the calculation of a vector of the fine level. This amounts to including the contribution from a vector of the coarse level for the prediction of twelve points only of the fine level as FIG. 6 illustrates. In this figure, a prediction is illustrated by an arrow 61 connecting a coarse level 62 to a finer level 63.

The aforesaid predictions 61 can each be improved by a further temporal prediction. Thus, a disparity vector estimated at a given point at a preceding instant t−1 between right Ir(t−1) and left Il(t−1) images at the same level of resolution is for example projected temporally in the direction of the motion vector associated with the given point towards the images Ir(t), Il(t) captured at the instant t. A method of temporal prediction which can be applied is described in French Patent No. 2,675,002: "Procédéde classification des pixels d'une image appartenant àune séquence d'images animées et procédé d'interpolation temporelle d'images utilisant ladire classification" [Process for the classification of the pixels of an image belonging to a sequence of moving images and process for the temporal interpolation of images using the said classification].

Thus, the calculation of the disparity vector is performed at every point of the image, level after level in the multi-resolution pyramid, from the coarsest to the finest constituted by the original image which is not sub-sampled. Four prediction vectors can be proposed when calculating each disparity vector: one vector arising from the vector calculated at the preceding instant, projected in the direction of motion, and three calculated at the immediately coarser level. It follows that only a small correction is necessary around such a prediction in order to obtain the correct disparity vector.

A disparity vector to be estimated $\overline{D}$ is the sum of a prediction vector $\overline{P}$ and a correction $\overline{\delta}$, i.e.:

$$\overline{D} = \overline{P} + \overline{\delta} \qquad (6)$$

Depending on the maximum amplitude, horizontally and vertically, of the disparity vector to be estimated, the search around the predication of the latter, represented by a vector, can for example be performed solely horizontally or in both directions, horizontal and vertical. French Patent No. 2,663,178 describes a search in both directions. Such a correction of resolution of ±1 pixel, initialized to 0 at a level N-1 of the pyramid for example, leads to a maximum value equal to:

$$|Dmax| = \sum_{k=0}^{N-1} 2^k \qquad (7)$$

Thus, the number of levels Nmax+1 required to estimate a disparity with maximum amplitude equal to the aforesaid maximum value |Dmax| is given by the integer part of the logarithm to the base 2 of this maximum value |Dmax|, i.e.:

$$\text{Nmax=integer part of log2 (|Dmax|)} \qquad (8)$$

In order, in particular, to economize on the number of levels of resolution, it is possible to separate the calculation of the disparity vector horizontally and vertically. Let |Dx max| and |Dy max| be the maximum values of the disparity, horizontally and vertically respectively. A ±1 pixel search initialized at 0 is necessary only starting from the level of order Nx max horizontally and of order Ny max vertically, these levels Nx max, Ny max being calculated from the two preceding relations (7) and (8). |Dx max| being for example assumed to be greater than |Dy max|, a solely horizontal search is conducted in the pyramid between the levels Nx max and Ny max+1, followed by a two-dimensional search, horizontally and vertically, between the level Ny max and 0.

Thus, the starting level for the estimation of disparity in the pyramid is calculated as a function of the maximum disparity to be attained, fixed a priori. This calculation is for example carried out separately for the horizontal disparity and vertical disparity, a simple horizontal search being conducted for as long as the maximum amplitude, vertically, does not justify a two-dimensional search.

The disparity vector chosen is the one which minimizes a certain cost function such as described for example in French Patent No. 2,663,178. A cost function can for example be the sum of the squares of the differences in luminance between the right and left images, the sum being taken for example over a window of 3×3 pixels, centered at the point of calculation of the disparity vectors.

It is possible to deduce a measure of confidence for the chosen disparity vector. In a homogeneous region of the image in particular, the values of the cost function being substantially equal whatever vector is tested, the confidence in the vector chosen will be low. On the other hand, in a zone of the image with a steep gradient, the correct vector corresponds to a very sharp minimum in the cost function and is therefore very reliable.

The confidence is for example calculated separately through the horizontal component and vertical component of the vector. If Px is the horizontal component of the prediction vector, values Px±n are proposed for the corrected vector, n being equal for example to 2 if the search is one-dimensional or to 1 if the search is two-dimensional, four vectors then being proposed. The vector which minimizes the cost function having been chosen, it has horizontal component Pxc where Pxc belongs to the interval [Px−n, Px+n]. In order to bracket the minimum value of the cost function, the confidence is calculated over the interval [Px−n−1, Px+n+1], even if the choice of minimum is made in the interval [Px−n, Px+n].

With F representing the cost function, three values of this function are available F(Pxc), F(xc−1) and F(Pxc+1). The confidence conf (Pxc) in the horizontal component Pxc of the chosen vector is given for example by the following two relations:

$$Curv(Pxc) = \frac{F(Pxc-1) + F(Pxc+1) - 2F(Pxc)}{2} \qquad (9)$$

$$Conf(Pxc) = \frac{curv(Pxc)}{K + F(Pxc)}, \qquad (10)$$

K being a positive constant.

A confidence thus defined varies from 0 to +∞ and it can be advantageous to restrict its entire variations to the interval [0, 1]. To do this, it is possible to define a normalized confidence cf (Pxc) for the horizontal component Pxc of the prediction vector, this normalized confidence being defined by the following relation:

$$cf(Pxc) = \frac{conf(Pxc)}{1 + conf(Pxc)} \quad (11)$$

by combining relations (10) and (11), it follows that:

$$cf(Pxc) = \frac{curv(Pxc)}{K + curv(Pxc) + F(Pxc)} \quad (12)$$

The normalized confidence thus defined tends asymptotically to 1 as the curvature of the curve of the cost function F increases. The constant K makes it possible to control the variation in confidence.

FIG. 7 depicts by way of example two curves of possible cost function F. The abscissa axis represents the values of the horizontal component Px of the prediction vector and the ordinate axis represents the cost function F. One curve 71 possesses a high radius of curvature for the component Pxc signifying that the chosen prediction vector possesses high confidence. One curve 72 possesses a low radius of curvature for this component, signifying that the chosen vector possesses low confidence.

Relations analogous to the preceding relations (9), (10), (11), (12) can be obtained for the vertical component Py of the chosen prediction vector, its processing being identical.

A confidence measure, lying between 0 and 1, is therefore associated with the horizontal component and with the vertical component of each estimated disparity vector. A corrected vector is associated with each of the proposed vectors, four in number for example, and a confidence and a cost value are associated with each corrected vector. The corrected vector chosen is for example the one which minimizes the cost function, which therefore has the minimum cost value.

If this minimum is not sufficiently marked, the choice is for example guided by the confidence.

An oriented smoothing, or filtering, of the disparity vectors is for example carried out in the multiresolution pyramid, at all levels of resolution, between the estimation and prediction of the finer level. This smoothing makes it possible in particular to propagate the values with high confidence towards the zones of the image with low confidence. A smoothing technique is described in particular in the article by P. Anandan: "A computational framework and an algorithm for the measurement of visual motion", International Journal of Computer Vision, 2, 283–310, 1989.

The smoothing is for example conducted independently on the horizontal component and vertical component of a disparity vector.

I claim:

1. Process for estimating disparity between the monoscopic images making up a stereoscopic image, comprising the steps of:

first, carrying out one and the same hierarchical decomposition of each monoscopic image by levels of resolution, thereby building at least three pyramids of images of increasing resolutions, one low-frequency image pyramid and two high-frequency image pyramids in the horizontal and vertical directions of the images;

second, estimating a disparity at the coarsest level of resolution and in refining the estimate in each level as the resolution increases, the disparity being represented at each point of the image by a disparity vector whose origin is situated at the point of one of the monoscopic images and on the tip at the corresponding point of the other monoscopic image;

the estimating of disparity being realized with the aid of a hierarchical decomposition of the monoscopic images into sub-bands while preserving at each level of the decomposition the low frequency band and the high frequency bands respectively representing the vertical and the horizontal outlines of the images, for each estimate and at a given resolution level, three prediction vectors being used to calculate a disparity vector of the level higher than said given resolution level;

an additional temporal prediction being realized by projection of a disparity vector estimated, at the moment t−1, at a given point between the monoscopic images being, at this moment, in the same resolution level, said projection being realized in the direction of the vector defining the movement between moments t−1 and t, t being a moment t−1.

2. Process according to claim 1, characterized in that the disparity vector calculation is realized separately for the horizontal disparity and for the vertical disparity of the image, the maximal values of the horizontal and vertical disparities being fixed a priori.

3. Process according to claim 2, characterized in that only an horizontal disparity search is realized as long as the vertical amplitude of the disparity has not reached the maximal a priori fixed value.

4. Process according to claim 1, characterized in that the disparity vector is chosen as the one which minimizes a cost function being the sum of the squares of the differences in luminance over the points of a window centered at the calculation point of the disparity vectors.

5. Process according to claim 1, characterized in that it comprises a calculation step of a confidence function allowing to measure the confidence level of the chosen disparity vector.

6. Process according to claim 1, characterized in that a filtering of the disparity vectors is realized, at each resolution level, after the estimating and before the prediction of each disparity vector.

* * * * *